US011492247B1

(12) United States Patent
Gonzalez

(10) Patent No.: US 11,492,247 B1
(45) Date of Patent: Nov. 8, 2022

(54) LARGE WATER BOTTLE DISPENSER

(71) Applicant: Uxmal Gonzalez, Oak View, CA (US)

(72) Inventor: Uxmal Gonzalez, Oak View, CA (US)

( * ) Notice: Subject to any disclaimer, the term of this patent is extended or adjusted under 35 U.S.C. 154(b) by 29 days.

(21) Appl. No.: 17/307,143

(22) Filed: May 4, 2021

Related U.S. Application Data

(60) Provisional application No. 63/021,732, filed on May 8, 2020.

(51) Int. Cl.
 B67D 3/00 (2006.01)
 B67D 1/08 (2006.01)

(52) U.S. Cl.
 CPC ......... B67D 1/0892 (2013.01); B67D 3/0029 (2013.01); *B67D 2210/00097* (2013.01)

(58) Field of Classification Search
 CPC .................................................. B67D 3/0029
 USPC .................................................. 141/284, 366
 See application file for complete search history.

(56) References Cited

U.S. PATENT DOCUMENTS

| | | | | |
|---|---|---|---|---|
| 1,814,342 A | * | 7/1931 | Smith | B67D 3/0029 280/30 |
| 5,288,200 A | * | 2/1994 | Burgers | B67D 3/0083 414/758 |
| 5,406,996 A | * | 4/1995 | Wagner | B67D 3/0083 141/391 |
| 5,582,503 A | * | 12/1996 | Sandoval | B66F 9/06 414/412 |
| 2005/0247076 A1 | * | 11/2005 | Luna | B67D 3/0029 62/389 |

* cited by examiner

*Primary Examiner* — Jason K Niesz
(74) *Attorney, Agent, or Firm* — Sandy Lipkin

(57) ABSTRACT

An apparatus for the storage, dispensing and transport of large water bottles. The apparatus has a base and two vertical supports extending upward therefrom. Between the two vertical supports is at least one cage that supports a large water bottle and is hingedly attached to the vertical supports such that the cage is in a substantially vertical position for transport and storage and can be tipped at an angle for dispensing water. A second water bottle cage that is the same structure as the top cage but cut in half and situated in a horizontal position can be placed below the first water bottle cage for storage and transport.

2 Claims, 5 Drawing Sheets

LARGE WATER BOTTLE DISPENSER

REFERENCE TO PRIOR APPLICATION

This application claims priority of the provisional patent application 63/021,732, filed May 8, 2020 entitled LARGE WATER BOTTLE DISPENSER by Uxmal Gonzalez.

BACKGROUND OF THE INVENTION

Field of the Invention

The field of this invention relates generally to the field of water bottle dispensers and more particularly toward a large carrier and dispenser for water bottles that hold 5 gallons of water.

Description of the Prior Art

Water bottles of all sizes are used to provide clean, potable drinking water. These water bottles range in size of a few ounces to 5-gallon bottles, typically. Small water bottles are wasteful and overly costly due to the production of the small plastic bottles. They are typically tossed after use as well.

5-gallon bottles can store much larger amounts of water so are less wasteful with plastic. These bottles are also the type are typically refilled, additionally avoiding waste.

The problem with the 5 gallon water bottle is it is not easy to dispense from without a dispenser which is typically an electronic unit that can provide for both hot and cold water and upon which the 5-gallon water place is placed in an inverted position so that the water enters a well in the dispenser to be further dispensed through a nozzle.

These types of dispensers require electricity and are not always convenient for when access to electric power is needed. Additionally, due to the position that they are in, i.e., inverted completely so that part of the water is transferred to the dispenser, the 5 gallon water bottle typically stays on top of the dispenser until it is emptied and therefore is not easily transported to another location once dispensed.

It is the object of the instant invention is to provide for a dispenser for 5 gallon and other large size water bottles that does not require electricity, is easily portable and that allows for the water bottle to be righted out of the dispensing position for further transport and use.

SUMMARY OF THE INVENTION

The basic embodiment of the present invention teaches an apparatus for dispensing water from larger water bottles comprising: a supporting base; two vertical members extending upward from said supporting base; a cage for holding a large water bottle in a substantially vertical position, said cage being hingedly attached to said two vertical members such that said cage can be tipped into an angled position away from said substantially vertical position from which water can be dispensed and then returned to its substantially vertical position when not in use.

The above embodiment can be further modified by defining that a second cage that is cut in half is positioned below said cage in a substantially horizontal position to allow for storage of a second large water bottle.

The above embodiment can be further modified by defining that one or more wheels are attached to said base and wherein said two vertical members are grippable thereby allowing said apparatus to be transported by a user tipping said apparatus by gripping said vertical members and rolling said base along the ground along said one or more wheels.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF A PREFERRED EMBODIMENT

Figure 1:
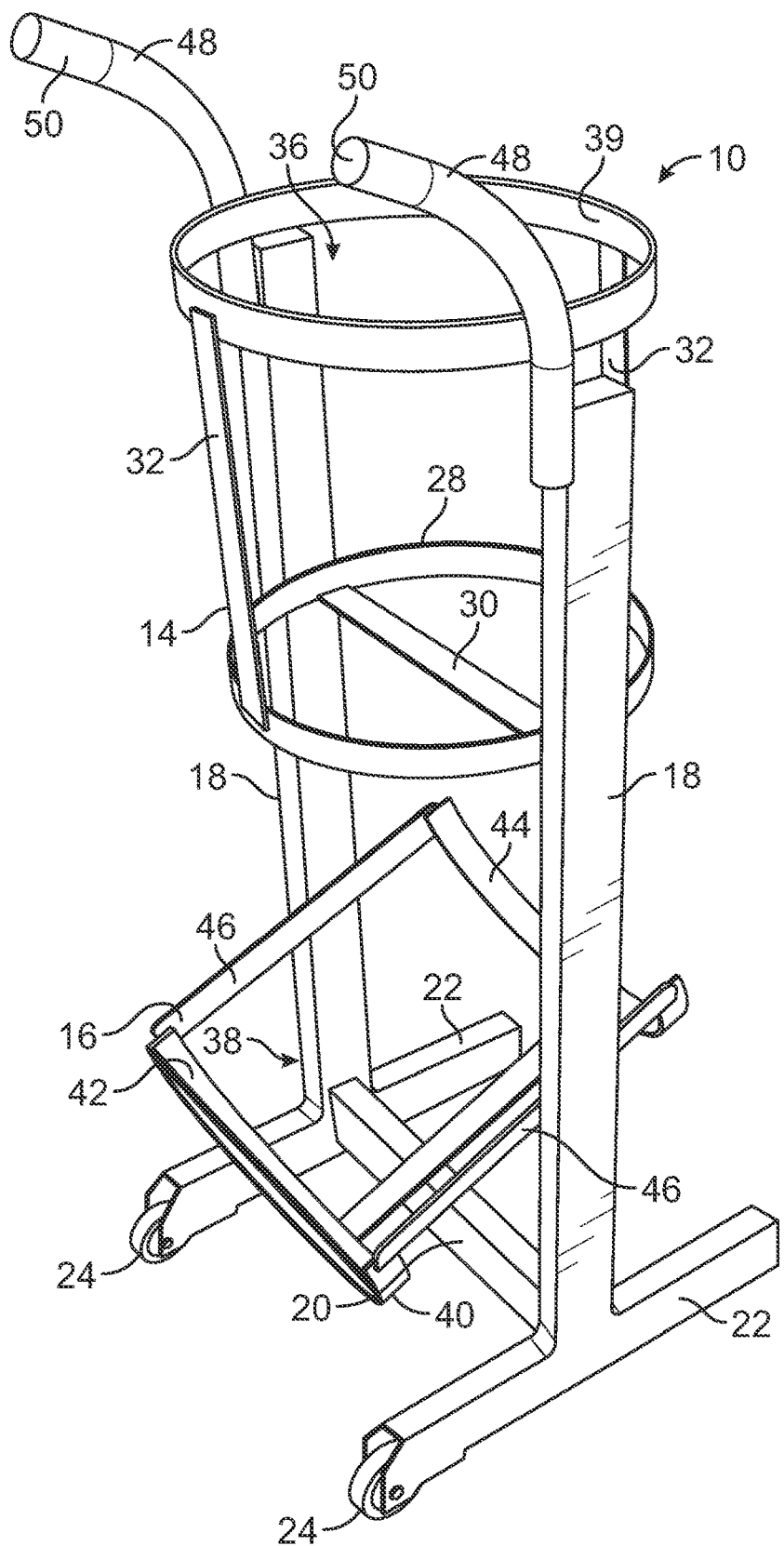
FIG. 1 is a rear perspective view of the water bottle dispenser of the instant invention without water bottles placed thereon.
Figure 2:
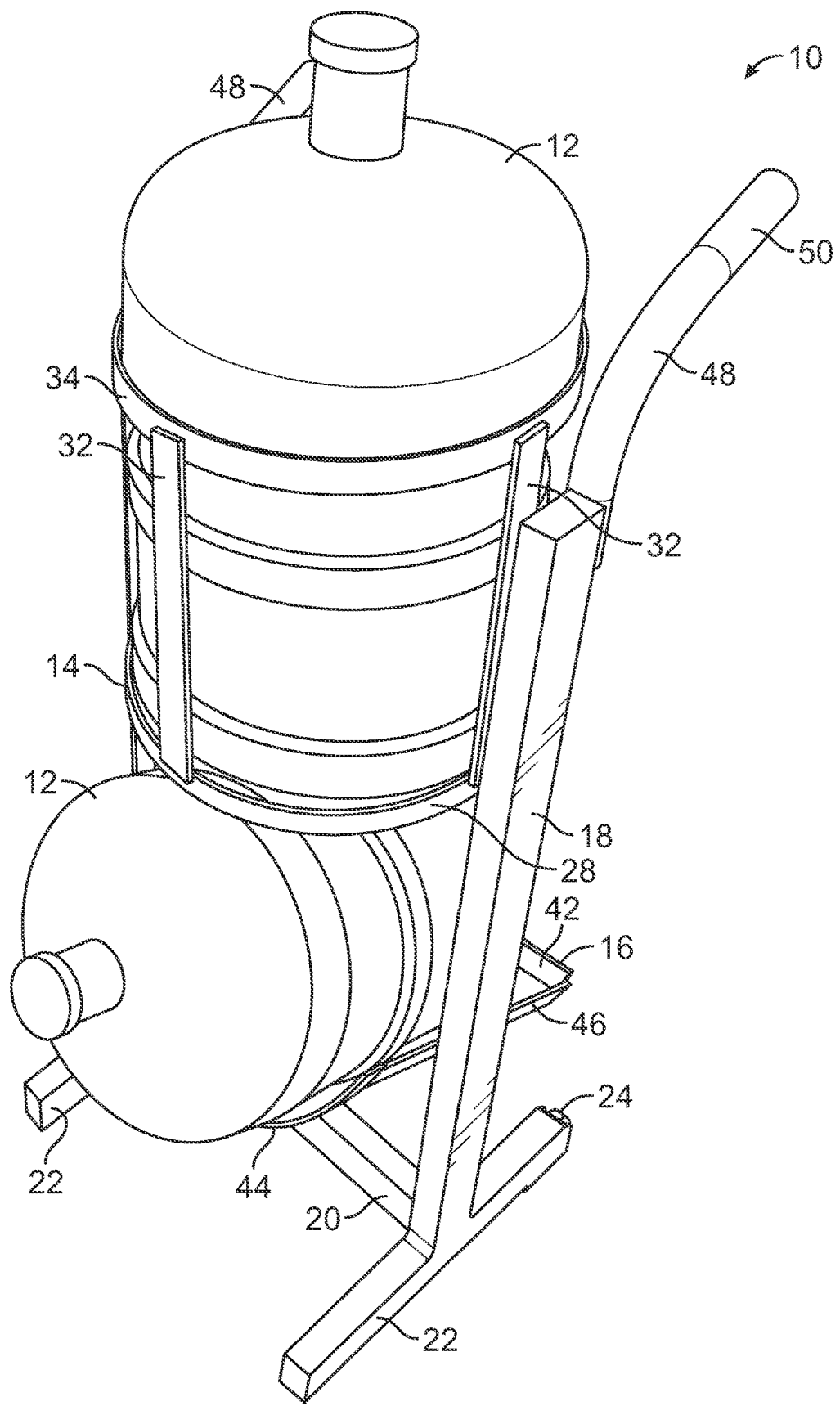
FIG. 2 is front perspective view of the water bottle dispenser of the instant invention with two 5 gallon water bottles placed thereon.
Figure 3:
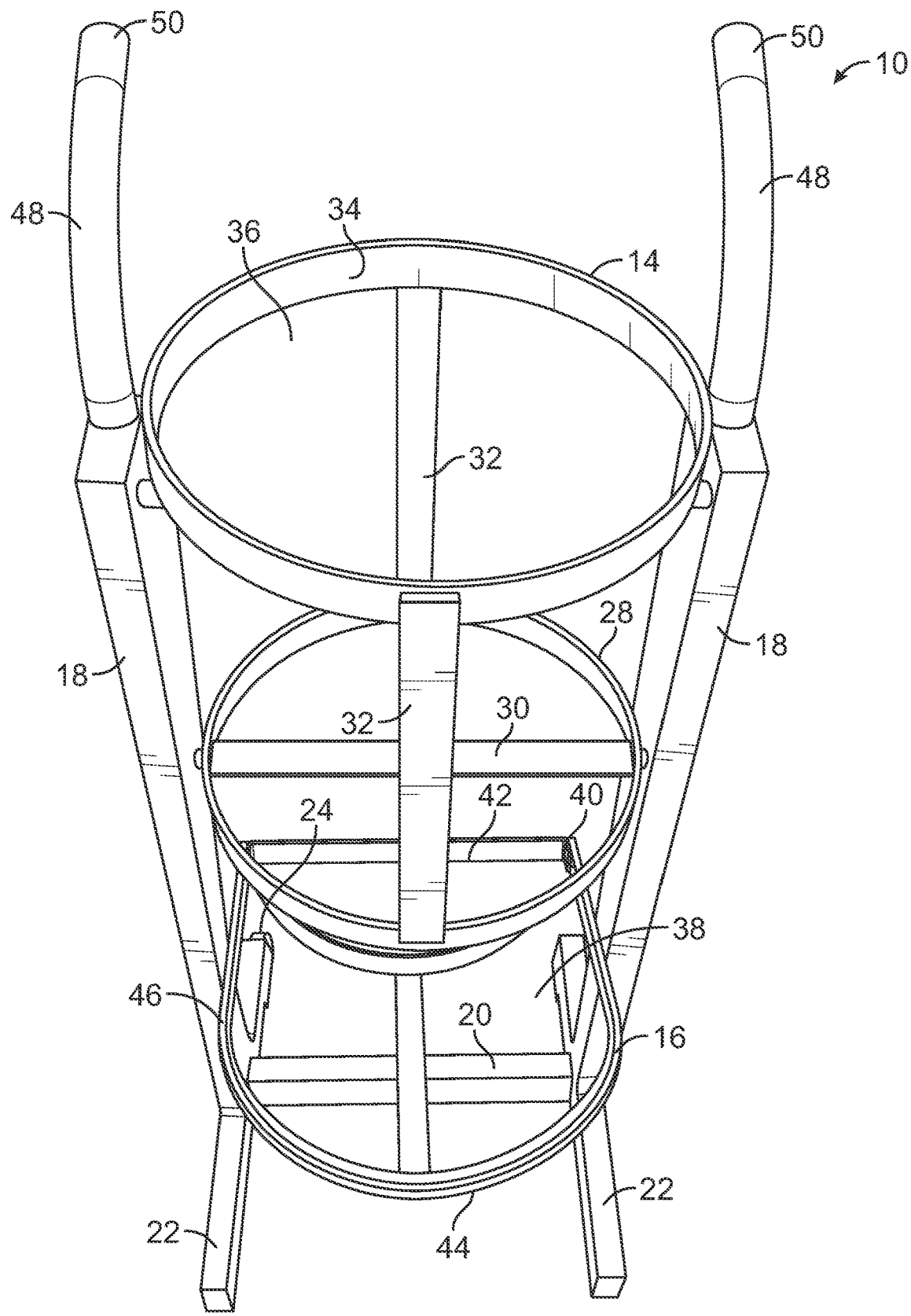
FIG. 3 is a top isometric view of the water bottle dispenser of the instant invention without water bottles placed thereon.

Turning to the drawings, the preferred embodiment is illustrated and described by reference characters that denote similar elements throughout the several views of the instant invention.

Figure 4:
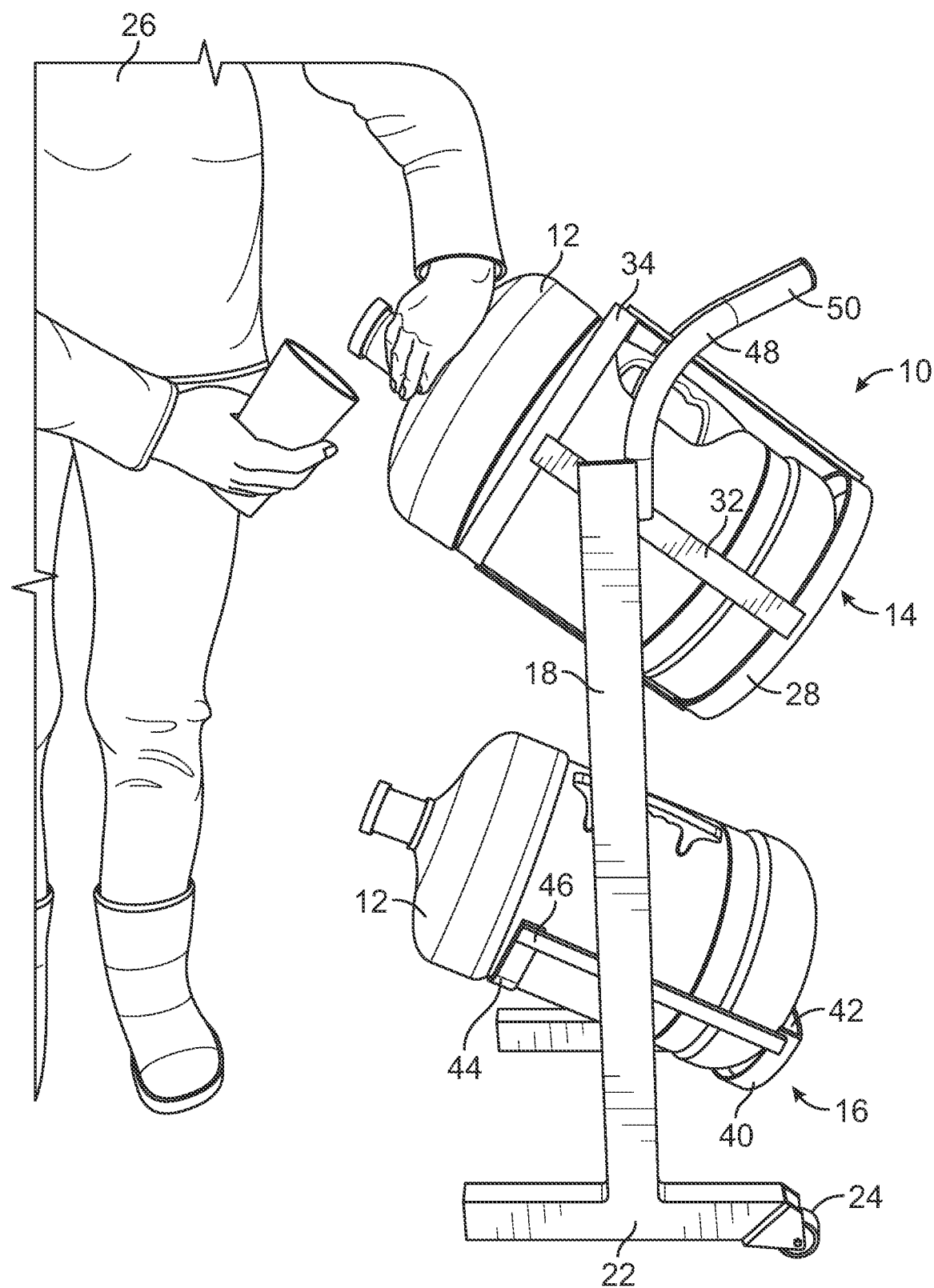
FIG. 4 is a side view of the water bottle dispenser of the instant invention showing a user dispensing water from the top water bottle.
Figure 5:
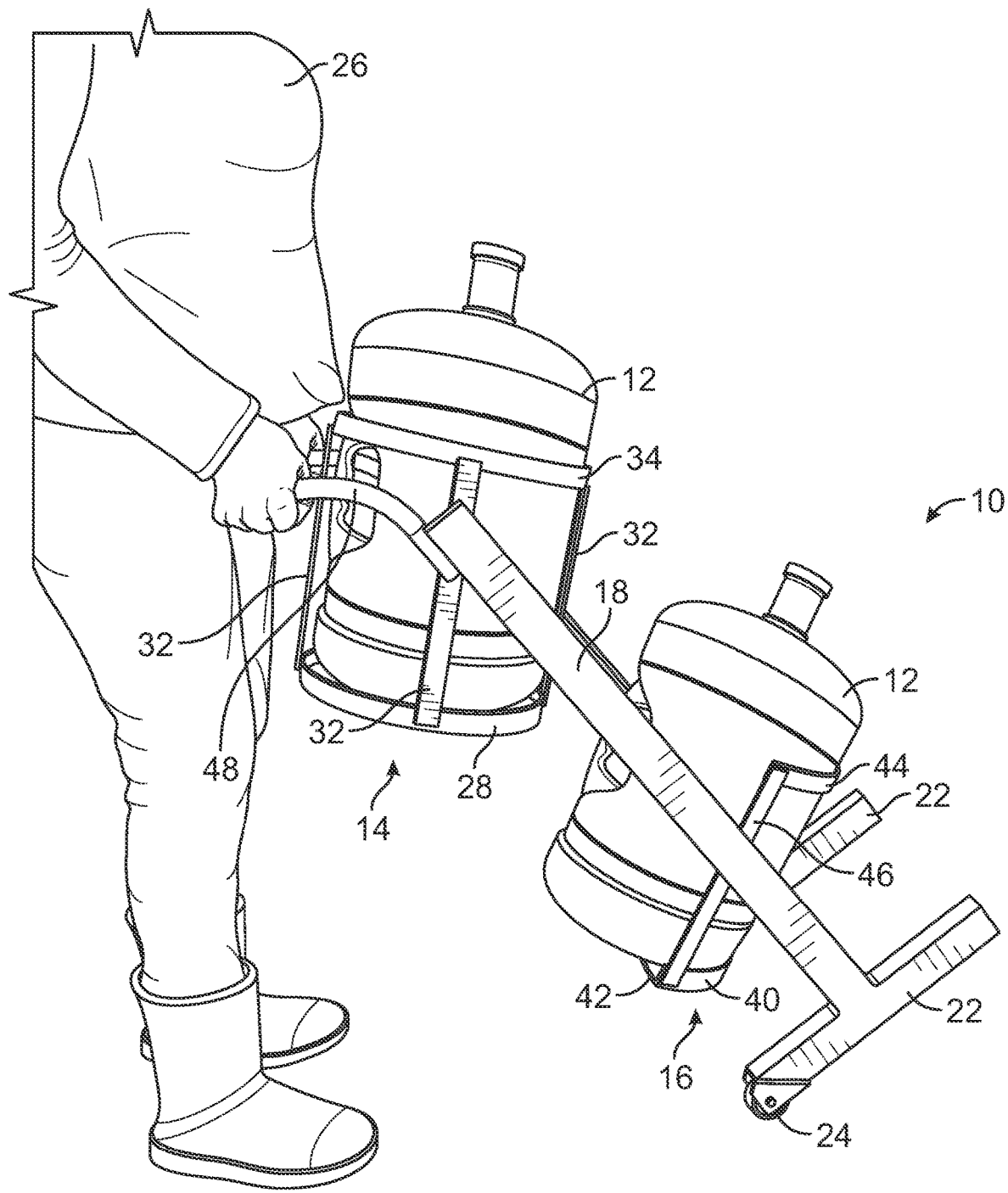
FIG. 5 is a side view of the water bottle dispenser of the instant invention with water bottles placed thereon and a user using it to transport the water bottles and the dispenser.

The preferred embodiment of the instant invention provides for a dispenser 10 for 5 gallon and other large size water bottles 12. The device 10 is a portable stand that provides a top cage 14 that surrounds a top water bottle 12, i.e., a water bottle 12 that is housed at the top of the dispenser 12. A half cage 16 that is situated substantially horizontally below the top cage 14 holds a second water bottle 12. The top cage 14 is affixed to upright supports 18 that are hinged so that the top cage 14 can be tilted into a position that allows for water to removed therefrom. (See FIG. 4.) Once the water has been dispensed, the top cage 14 can be tilted back up into the upright position.

The a storage half-cage 16 is situated below the dispensing top cage 14 to store a second water bottle 12. As seen in the figures, the device 10, in addition to the side vertical uprights 18, includes a base 20 oriented substantially perpendicular from the vertical uprights 18. At either end of the base 20 and at the bottom of each vertical upright 18 is a support platform 22 that is substantially perpendicular to both the base 20 and the vertical uprights 18. At the inside end of each support platform is a wheel 24 that allows for transport of the entire device tipped. Attached at the top of each vertical upright 18 are curved handles 48 with rubber caps 50 for easy gripping that angle out from the device 10 and toward the user 26 to allow for easy tipping of the entire device 10.

The top cage 14 that can hold a large water bottle 12 is attached to each vertical member via a hinge (not shown) that allows the top cage 14 to tip down to a position from which water can be poured therefrom. This top cage 14 has an arcuate bottom support 28 with a support member 30 along the center diameter of the support 28. Two or more vertical supports 32 are attached to the arcuate bottom support parallel to each other and substantially perpendicular with said center diameter support member 30. The vertical supports 32 then attach to an arcuate top support 34 that has an open top 36 to allow for the easy placement therein of a water bottle 12.

Below this top cage 14 is a second half cage 16 that is ostensibly a half cage version of the upper dispensing cage 14. This half cage 16 allows for the horizontal storage of a second water bottle 12. If one were to cut the top cage 14 in half and tilt in 90 degrees, then the structure of the half cage 16 is formed. The second water bottle 12 is placed into a trough 38 created by the 90 degree tilt and the removal of half the cage. This creates a bottom base with a half curve 40 and a base bar 42 to support the bottom of the water bottle 12. Another half curve 44 supports the other end of the bottle 12 and two side supports 46 secure the sides of the water bottle 12.

The invention illustratively disclosed herein suitably may be practiced in the absence of any element which is not specifically disclosed herein.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. An apparatus for dispensing water from larger water bottles comprising:
   a supporting base;
   two vertical members each of said two vertical members having a side member, said side member being perpendicular to each of said two vertical members wherein said two vertical members extend perpendicularly upward from said supporting base;
   a wheel attached to a first end of each of said side members thereby allowing for said supporting base and said two vertical members to be tippable into a horizontal dispensing position;
   a cage for holding a large water bottle in a substantially vertical position, said cage being hingedly attached to said two vertical members such that said cage can be tipped into an angled position away from said substantially vertical position from which water can be directly dispensed therefrom and then returned to its substantially vertical position when not in use; and
   two curved but unattached to each other handles that are attached to a top portion of each of said two vertical members.

2. The apparatus as defined in claim 1 wherein a second cage that is cut in half is positioned below said cage in a substantially horizontal position to allow for storage of a second large water bottle.

\* \* \* \* \*